May 21, 1957  J. A. SIMPSON, JR  2,793,309
NEUTRON PROPORTIONAL COUNTER
Filed Oct. 31, 1946
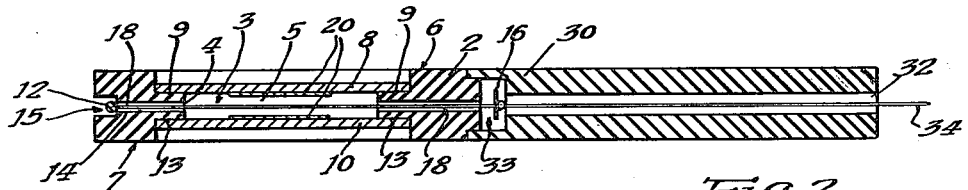
Fig. 2.
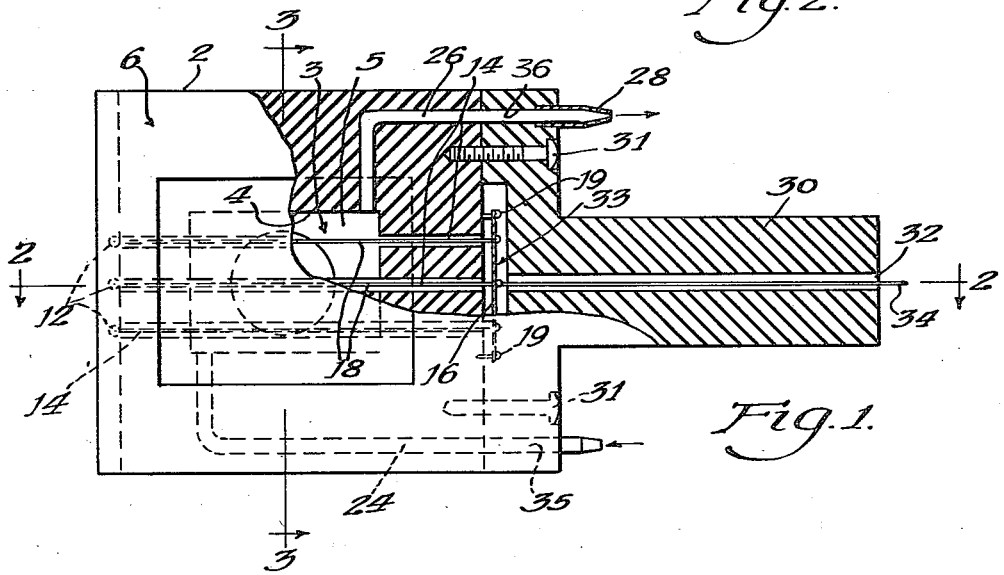
Fig. 1.
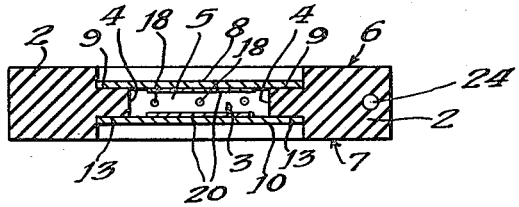
Fig. 3.
Fig. 4.
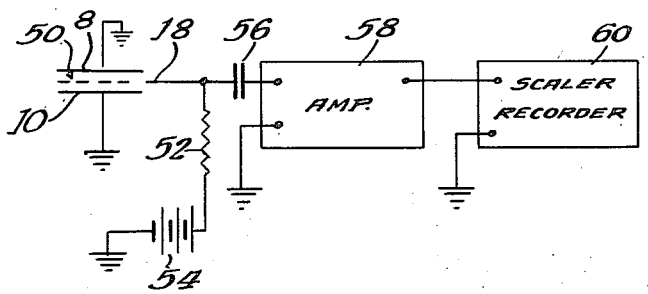
Inventor:
John A. Simpson Jr.
By: Robert A. Lavender
Attorney.

2,793,309

NEUTRON PROPORTIONAL COUNTER

John A. Simpson, Jr., Chicago, Ill., assignor to the United States of America as represented by the United States Atomic Energy Commission Application October 31, 1946, Serial No. 706,946

3 Claims. (Cl. 313—61)

This invention relates broadly to a radioactivity counter, and more specifically, it relates to a proportional counter for measuring the change in the neutron flux density caused by the presence of thermal neutral absorbers.

Proportional neutron counters which employ a gas or vapor-filled chamber enclosing an outer electrode and a central electrode have been disclosed in the prior art. Between said electrodes a high potential gradient is provided to create an electric field in proximity to the central electrode so that the electrons formed from an ionizing event will cause ionization of the gas or vapor molecules by collision. Consequently, when a heavily ionizing particle enters the sensitive region surrounding the central electrode, negative charges are collected on the central electrode so as to produce a pulse of current. Since the pulse of current is approximately proportional to the initial ionization of the particle, the device is referred to as a proportional counter. By flowing the current pulse through a resistor, a corresponding voltage pulse is developed. The size of the voltage pulse produced by the counter is thus proportional to the number of ions formed within the counter. The proportional counter makes it possible to distinguish between heavy particles, such as alpha particles, protons, and deuterons, and beta particles and gamma rays, which produce much smaller voltage pulses.

Proportional counters have been disclosed in the prior art for determining thermal neutron densities. These counters commonly employ boron or boron compounds as the sensitive neutron absorbing material. The $_5B^{10}$ nucleus captures a thermal neutron and undergoes an $n\alpha$ reaction to form $_3Li^7$ with the emission of an alpha particle. The alpha particle so emitted are converted to voltage pulses and are then amplified and counted by means of an electronic device, which is adjusted to count only the relatively large pulses occasioned by alpha particles, and thus discriminates against a background of gamma or beta radiation. The number of alpha pulses so counted is proportional to the density of the neutron beam to which the counter is disposed.

The cavity walls of the counter are generally constructed of a material such as iron or brass, in order to insure sufficient strength when filling the counter with boron compounds, such as boron trifluoride, at relatively high gas pressures. These counter chamber materials possess relatively high neutron absorption.

One application of a slow neutron proportional counter is in the measurement of the neutron absorption of samples of materials. If the samples are extremely small, accurate measurement of their absorption for neutrons cannot be made by a counter constructed of materials which themselves have high absorption. The change occasioned by the introduction of the small sample is, in such a case, too small for accurate measurement.

An object of the present invention is to provide a neutron proportional counter, which is devoid of the above-named disadvantages disclosed in the prior art.

A further object of the invention is to provide a proportional counter constructed of materials possessing a slow neutron absorption cross section of a negligible amount even in measurement of weak neutron sources.

A more specific object of the invention is to provide a neutron proportional counter of such construction as to allow rapid mounting of a test sample, and sufficiently compact and portable to allow the counter to be moved over an entire neutron flux area.

A more specific object of the invention is to provide a low absorption neutron proportional counter with a gas-tight chamber, and to provide means for circulating a gas through the counter.

Other objects and advantages will become apparent from the following specification taken with the drawings, wherein:

Fig. 1 is a plan view of a neutron proportional counter tube, partly in section, embodying the teachings of the invention;

Fig. 2 is a longitudinal sectional view taken along line 2—2 of Fig. 1;

Fig. 3 is a sectional view taken along the line 3—3 of Fig. 1;

Fig. 4 is a schematic block diagram including a proportional counter tube, as shown in Figs. 1, 2, and 3, connected in cascade with an amplifier and a scaler-recorder.

Referring first to Figs. 1 to 3, inclusive, numeral 2 denotes a rectangular block of an insulating material, such as a plastic of methyl methacrylate composition, which has been machined and bored to form a rectangular aperture 3, having interior side walls 4, wherein an entrant tubulation 24 and an exit tubulation 26 are machined in said block 2, and extend into said aperture 3 from the outer periphery of said block 2 entering said aperture 3 at opposite corners thereof. The block 2 has shoulder portions 9 and 13 surrounding the aperture 3, as illustrated in Figs. 2 and 3. An upper outer rectangular conducting electrode 8 is positioned on the shoulder 9 of the upper outer surface 6, of said block 2, and the lower outer rectangular conducting electrode 10 is similarly positioned on the shoulder 13 of the lower outer surface 7 of said block 2, thereby forming with aperture 3 an enclosed gas-tight cavity 5. The outer electrodes 8 and 10 are made of electrically conducting material, such as aluminum or a conducting plastic.

The anterior end of the block 2 has a transverse slot 15 therein. Parallel to each other and equally spaced are three wire apertures 14, adapted to receive electrode wires 18, said apertures 14 extending through the block 2 from the slot 15 into the cavity 5 and from the cavity 5 through the opposite end of block 2. At the posterior end of the block 2, a metallic spring terminal strip 16, for example, of Phosphor bronze, is mounted to said block 2, as for example, by means of two spaced screws 19 affording the mounting for a central electrode comprising the before-mentioned wires 18, which are preferably 0.002 inch diameter platinum wires threaded through said apertures 14 and held at the anterior end of the block 2 by solder beads 12 which are greater in diameter than the diameter of the apertures 14. The wires 18 are affixed to the spring strip 16, for example, by solder, and tension is maintained in the wires 18 by spring strip 16.

Centrally deposited on each of the inner cavity surfaces of the outer electrodes 8 and 10, respectively, is a thin disc-shaped boron coating 20, for example, approximately 1 inch in diameter and 3 microns thick.

The cavity 5 is sealed along the outer edges of the outer electrodes 8 and 10 with a material such as paraffin wax so as to render it gas-tight in order to allow the continuous flow of an ionizing gas, such as methane composition, at a pressure slightly greater than atmospheric, entering through the entrance tubulation 24 and leaving through the exit tubulation 26. The use of a flowing gas in a proportional counter is not in itself the subject of the present invention, and is more fully described in the copending application of John A. Simpson, Jr., Serial No. 595,192, filed May 22, 1945, now Patent No. 2,595,550.

An insulating mounting 30 of a plastic material is rigidly attached to the block 2 by means of mounting screws 31. The anterior surface of the mounting 30 is pressed flush against the posterior surface of the block 2. Centrally disposed in said plastic mounting 30 is an opening 32 extending the entire length of the mounting 30 into a rectangular cavity 33, adapted to receive the spring strip 16, so as to accommodate the insertion of the high voltage lead 34, which is connected to the spring strip 16, and thus to the central electrode wires 18.

The mounting 30 has longitudinal apertures 35 and 36 bored therethrough corresponding to the entrance and exit tubulations 24 and 26 of block 2, so as to form continuous apertures therein. The apertures 35 and 36 have shoulder portions at the posterior ends thereof adapted to receive, by pressure fit, plastic nipples 28, which are adapted to be attached to any standard system for continuous flow of gas at a pressure slightly greater than atmospheric pressure. Since the gas-flowing system, external of the counter, constitutes no part of the invention, and since any standard system may be used, this portion of the system incorporating the counter of the present invention is not illustrated in the drawing.

In Fig. 4 is illustrated in block form a typical circuit utilizing the counter which is the subject of the present invention. The counter 50 is connected in series with a resistor 52, for example, of 100,000 ohms, and a supply of direct voltage 54, for example, of 2500 volts. The outer electrodes 8 and 10 are grounded, as is the negative terminal of the voltage supply 54. The central electrode wires 18 are connected to the positive side of the voltage supply 54 through the resistor 52. When the counter 50 is exposed to thermal neutrons, the boron coatings 20 (shown in Figs. 2 and 3) capture a portion of the incident neutrons and emit alpha particles, which cause secondary ionization of the gas in the counter allowing current to flow through the resistor 52 and thus lowering the potential of the center wires 18. It shall be noted that the coating material adapted to emit ionizing particles on absorption of neutrons, as designated by numeral 20, shall not be limited to boron or boron compounds, but shall include such materials that exhibit an $n\alpha$ reaction, for example, boron and lithium and such materials that exhibit an $n$-fission reaction, for example, uranium and plutonium. The negative voltage pulse thus created is transmitted to an amplifier 58 through a coupling condenser 56. The amplified pulses are transmitted to a conventional scaler and recorder 60, the pulse time being proportional to the incident flux of slow neutrons.

One useful application of the neutron proportional counter described above and illustrated in the drawing is in the assaying of impurities present in uranium samples. In this operation, the counter is first exposed to a neutron source, which is placed above it, and the resultant counting rate is recorded. The impurity sample pellet which has been chemically separated from the original uranium sample is then mounted upon the upper outer electrode 8, which is, for example, of aluminum 0.15 inch in thickness, so as to be interposed between the neutron source and the boron coating 20. The counter is originally calibrated in terms of the counting rate as a function of the boron content of pellets of known boron content.

It is to be noted that the boron calibration pellets act merely as an absorber, since the alpha particles emitted therefrom are absorbed by the upper outer electrode 8 before entering the cavity 5. The relative change in total counts is a linear function of the amount of boron in the calibration pellets. Thus, the unknown impurities may be measured in terms of an amount of boron producing an equivalent neutron absorption.

The prior art discloses a relative procedure for determining the total neutron absorption of a sample of unknown impurities which is commonly called the "shot gun" method. This method is used to determine the neutronic purity of a material, such as uranium, to be used in a neutronic reactor. Neutronic purity is defined as the composition of a material which is substantially free from particular elements having relatively great neutron capture cross-sections, commonly called absorbers. The impurity absorbers are chemically separated, formed into sample pellets and then compared with calibration pellets containing known amounts of boron.

The prior disclosed method involves the insertion of a thin neutron detector such as a piece of indium foil in the effective neutron flux area produced by a thermal neutron source. The indium foil becomes radioactive by an amount proportional to the density of the neutrons at the foil and the time of exposure. This radioactivity is then measured. A neutron absorbent pellet, such as a standard amount of boron is then placed close to or on the detector foil, will effectively decrease the thermal neutron density in the proximity of the foil and will consequently lower the induced activity of the bombarded foil. By replacing the calibrated boron absorbing pellet with a pellet containing the impurities from a known amount of material, such as uranium, and again measuring the reduced radioactivity of the indium foil, a comparison is obtained between the absorption caused by the unknown impurity composition and the calibrated boron absorber. This method is more fully described in a copending application of Enrico Fermi and H. L. Anderson, Serial No. 630,123, filed November 21, 1945.

The principal objection to the indirect foil "shot gun" method is in the relative sensitivity of the conventional neutron counters used in measuring the counting rates. These counters are generally made of brass and steel in order to withstand the pressures when filled with $BF_3$. These counters are large and bulky and possess a relatively high slow neutron absorption due to the presence of iron and brass. The "shot gun" test method requires a counter having a low slow neutron absorption cross-section and a sensitivity equivalent to only a few hundredths of a milligram of boron, since the absorptions due to the impurities are equivalent to a few milligrams of boron. With conventional neutron counters, it is possible to detect an equivalent of only 0.1 gram of boron. In addition, the indirect foil method requires handling of the foils between the period of exposure and counting which will introduce inherent errors in the results. The neutron proportional counter described in the present invention has a slow neutron absorption cross-section equivalent of less than one hundredth of a milligram of boron, thereby affording sufficient sensitivity for measuring relatively small changes in neutron flux density. In addition, the present device can be inserted into an effective neutron flux area and measure directly the relative change in the neutron flux density.

Thus it will be seen that there has been provided an efficient and sensitive proportional counter in which the self-neutron absorption is minimized. Furthermore, there has been provided a direct counting proportional counter that maintains its calibration despite extensive use thereof, and which will give a high degree of amplification without the production of spurious pulses.

It will be apparent that modification will be suggested to those skilled in the art after having had the benefit of the teachings of the invention. For this reason, the invention should not be limited except insofar as set forth in the following claims.

What is claimed is:

1. A neutron proportional counter comprising, in combination, a block of electrically insulating material having a low neutrol capture cross section and an orifice centrally positioned through at least one side thereof, a pair of spaced apart conducting plates mounted within the orifice parallel to an orificed side, said plates being sealed in air-tight fashion to the block, at least one of the plates being mounted a substantial distance below the adjacent orificed side of the block, and a thin coating of material emitting ionizing particles on neutron absorption adhering to at least one of the contiguous surfaces of the plates.

2. A neutron proportional counter comprising the elements of claim 1, and means for flowing a hydrocarbon gas through the space formed between the plates.

3. A neutron proportional counter comprising the elements of claim 1 wherein the block consisting of plastic of methyl methacrylate composition.

References Cited in the file of this patent

UNITED STATES PATENTS

| | | |
|---|---|---|
| 2,094,318 | Failla | Sept. 28, 1937 |
| 2,206,634 | Fermi et al. | July 2, 1940 |
| 2,288,718 | Kallmann et al. | July 7, 1942 |
| 2,397,073 | Hare et al. | Mar. 19, 1946 |
| 2,397,075 | Hare et al. | Mar. 19, 1946 |
| 2,398,934 | Hare | Apr. 23, 1946 |

OTHER REFERENCES

Brown: Article in Physical Review, vol. 59, June 5, 1942, pp. 954–956.